United States Patent
Engstrand

(12) 
(10) Patent No.: US 6,671,260 B1
(45) Date of Patent: Dec. 30, 2003

(54) DATA TRANSMISSION IN A POINT-TO-MULTIPOINT NETWORK

(75) Inventor: Rolf Engstrand, Skärholmen (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/563,952

(22) Filed: May 2, 2000

(51) Int. Cl.$^7$ ............................................... H04L 12/26
(52) U.S. Cl. ...................... 370/238; 370/395.4; 370/468
(58) Field of Search ................................. 370/432, 433, 370/442, 443, 447, 449, 453, 457, 458, 461, 462, 395.1, 395.4, 236, 238, 238.1, 395.42, 468

(56) References Cited

U.S. PATENT DOCUMENTS

| | | | |
|---|---|---|---|
| 5,278,833 A | * 1/1994 | Crisler et al. ................ | 370/348 |
| 5,390,360 A | * 2/1995 | Scop et al. ................... | 455/516 |
| 5,663,953 A | 9/1997 | Maekawa | |
| 5,936,949 A | * 8/1999 | Pasternak et al. ............ | 370/328 |
| 6,298,049 B1 | * 10/2001 | Vanhoof et al. ............. | 370/329 |
| 6,381,228 B1 | * 4/2002 | Prieto et al. ................. | 370/323 |

FOREIGN PATENT DOCUMENTS

| | | |
|---|---|---|
| EP | 855844 | 7/1998 |
| GB | 2213025 | 8/1989 |
| WO | 96/31046 | 10/1996 |
| WO | 98/44758 | 10/1998 |

OTHER PUBLICATIONS

Miki Yamamoto, Satoshi Machida, & Hiromasa Ikeda, "Access Control Scheme for Multimedia ATM Wireless Local Area Networks," Nov., 1998, IEICE Trans. Commun. vol. E81–B. No. 11, pp. 2048–2055.

* cited by examiner

Primary Examiner—Kwang Bin Yao

(57) ABSTRACT

A point-to-multipoint network includes a central node and a plurality of terminals connected to the central node via a transmission medium. The central node transmits frames of data downstream to said terminals in timeslots, and said terminals transmit data packets upstream in timeslots allocated by transmission permits contained in the downstream data. When transmitting a transmission permit to a terminal the central node reserves a time period in the future downstream data stream during which data destined for the terminal will be blocked from transmission. The reserved time period commences at a time location in the future data stream and has a duration, such that data transmitted to the terminal in a timeslot immediately following the reserved time period will arrive at said terminal after the same has terminated transmission of data in response to the permit. This reliably ensures that a terminal will not transmit and receive data simultaneously. Thus, interference between a transmitter and receiver in a terminal is avoided without recourse to costly filter circuitry.

18 Claims, 8 Drawing Sheets

| Terminal | Delay | Backlog | Time slot > | 1 | 2 | 3 | 4 | 5 | 6 |
|---|---|---|---|---|---|---|---|---|---|
|  |  |  | Time > | 0 | 10 | 20 | 30 | 40 | 50 |
|  |  |  | Requests |  |  |  |  |  |  |
| 1@ | 17 |  | 3 |  |  | s, i |  |  |  |
| 2 | 6 |  | 3 |  |  |  |  |  |  |
| 3 | 22 |  | 2 |  |  |  |  |  |  |
| 4 | 47 |  | 2 |  |  |  |  |  |  |
| Permit issued to |  |  |  | 1(s) |  |  |  | 1(s) |  |

Fig. 5

| Terminal | Delay | Backlog | Time slot > | 2 | 3 | 4 | 5 | 6 | 7 |
|---|---|---|---|---|---|---|---|---|---|
|  |  |  | Time > | 10 | 20 | 30 | 40 | 50 | 60 |
|  |  |  | Requests |  |  |  |  |  |  |
| 1@ | 17 |  | 3 |  | s, i | i |  |  |  |
| 2 | 6 |  | 3 |  |  |  |  |  |  |
| 3 | 22 |  | 2 |  |  |  |  |  |  |
| 4 | 47 |  | 2 |  |  |  |  |  |  |
| Permit issued to |  |  |  | 1 |  |  | 1(s) |  |  |

Fig. 6

| Terminal | Delay | Backlog | Time slot > | 3 | 4 | 5 | 6 | 7 | 8 |
|---|---|---|---|---|---|---|---|---|---|
|  |  |  | Time > | 20 | 30 | 40 | 50 | 60 | 70 |
|  |  |  | Requests |  |  |  |  |  |  |
| 1 | 17 |  | 2 | s, i | i |  |  |  |  |
| 2@ | 6 |  | 3 |  | i |  |  |  |  |
| 3 | 22 |  | 2 |  |  |  |  |  |  |
| 4 | 47 |  | 2 |  |  |  |  |  |  |
| Permit issued to |  |  |  | 2 |  | 1(s) |  |  |  |

Fig. 7

|  |  |  | Time slot > | 4 | 5 | 6 | 7 | 8 | 9 |
|  |  |  | Time > | 30 | 40 | 50 | 60 | 70 | 80 |
| Terminal | Delay | Backlog | Requests |  |  |  |  |  |  |
| 1 | 17 | 1 | 2 | i |  |  | s |  |  |
| 2 | 6 |  | 2 | i |  |  |  |  |  |
| 3@ | 22 |  | 2 |  |  |  | i |  |  |
| 4 | 47 |  | 2 |  |  |  |  |  |  |
| Permit issued to |  |  |  | 3 | 1(s) |  |  |  | 1(s) |

Fig. 8

|  |  |  | Time slot > | 5 | 6 | 7 | 8 | 9 | 10 |
|  |  |  | Time > | 40 | 50 | 60 | 70 | 80 | 90 |
| Terminal | Delay | Backlog | Requests |  |  |  |  |  |  |
| 1 | 17 |  | 2 |  |  | s,i |  |  |  |
| 2 | 6 |  | 2 |  |  |  |  |  |  |
| 3 | 22 |  | 1 |  |  | i |  |  |  |
| 4@ | 47 |  | 2 |  |  |  |  |  |  |
| Permit issued to |  |  |  | 1(s) |  |  |  | 1(s) |  |

Fig. 9

|  |  |  | Time slot > | 6 | 7 | 8 | 9 | 10 | 11 |
|  |  |  | Time > | 50 | 60 | 70 | 80 | 90 | 100 |
| Terminal | Delay | Backlog | Requests |  |  |  |  |  |  |
| 1 | 17 |  | 2 |  | s,i |  |  |  |  |
| 2 | 6 |  | 2 |  |  |  |  |  |  |
| 3 | 22 |  | 1 |  | i |  |  |  |  |
| 4@ | 47 |  | 2 |  |  |  |  |  | i |
| Permit issued to |  |  |  | 4 |  |  | 1(s) |  |  |

Fig. 10

| Terminal | Delay | Backlog | Time slot > Time > Requests | 7 60 | 8 70 | 9 80 | 10 90 | 11 100 | 12 110 |
|---|---|---|---|---|---|---|---|---|---|
| 1@ | 17 | | 2 | s,i | | | | | |
| 2 | 6 | | 2 | | i | | | | |
| 3 | 22 | | 1 | i | | | | | |
| 4 | 47 | | 1 | | | | | i | |
| Permit issued to | | | | 2 | | 1(s) | | | |

Fig. 11

| Terminal | Delay | Backlog | Time slot > Time > Requests | 8 70 | 9 80 | 10 90 | 11 100 | 12 110 | 13 120 |
|---|---|---|---|---|---|---|---|---|---|
| 1 | 17 | 1 | 2 | | | i | s | | |
| 2 | 6 | | 1 | i | | | | | |
| 3@ | 22 | | 1 | | | | | | |
| 4 | 47 | | 1 | | | | i | | |
| Permit issued to | | | | 1 | 1(s) | | | | 1(s) |

Fig. 12

| Terminal | Delay | Backlog | Time slot > Time > Requests | 9 80 | 10 90 | 11 100 | 12 110 | 13 120 | 14 130 |
|---|---|---|---|---|---|---|---|---|---|
| 1 | 17 | | 1 | | i | s,i | | | |
| 2 | 6 | | 1 | | | | | | |
| 3@ | 22 | | 1 | | | | | | |
| 4 | 47 | | 1 | | | i | | | |
| Permit issued to | | | | 1(s) | | | | 1(s) | |

Fig. 13

| Terminal | Delay | Backlog | Time slot > Time > Requests | 10 90 | 11 100 | 12 110 | 13 120 | 14 130 | 15 140 |
|---|---|---|---|---|---|---|---|---|---|
| 1 | 17 |  | 1 | i | s,i |  |  |  |  |
| 2 | 6 |  | 1 |  |  |  |  |  |  |
| 3@ | 22 |  | 1 |  |  |  | i |  |  |
| 4 | 47 |  | 1 |  | i |  |  |  |  |
| Permit issued to |  |  |  | 3 |  |  | 1(s) |  |  |

Fig. 14

| Terminal | Delay | Backlog | Time slot > Time > Requests | 11 100 | 12 110 | 13 120 | 14 130 | 15 140 | 16 150 |
|---|---|---|---|---|---|---|---|---|---|
| 1 | 17 |  | 1 | s,i |  |  |  |  |  |
| 2 | 6 |  | 1 |  | i |  |  |  |  |
| 3 | 22 |  | 0 |  |  | i |  |  |  |
| 4@ | 47 |  | 1 | i |  |  |  |  |  |
| Permit issued to |  |  |  | 2 | 1(s) |  |  |  |  |

Fig. 15

| Terminal | Delay | Backlog | Time slot > Time > Requests | 12 110 | 13 120 | 14 130 | 15 140 | 16 150 | 17 160 |
|---|---|---|---|---|---|---|---|---|---|
| 1 | 17 |  | 1 |  |  |  |  |  |  |
| 2 | 6 |  | 0 | i |  |  |  |  |  |
| 3@ | 22 |  | 0 |  | i |  |  |  |  |
| 4 | 47 |  | 1 |  |  |  |  |  | i |
| Permit issued to |  |  |  | 4 | 1(s) |  |  |  | 1(s) |

Fig. 16

| Terminal | Delay | Backlog | Time slot ><br>Time ><br>Requests | 13<br>120 | 14<br>130 | 15<br>140 | 16<br>150 | 17<br>160 | 18<br>170 |
|---|---|---|---|---|---|---|---|---|---|
| 1 | 17 |  | 1 |  |  | s,i |  |  |  |
| 2 | 6 |  | 0 |  |  |  |  |  |  |
| 3@ | 22 |  | 0 | i |  |  |  |  |  |
| 4 | 47 |  | 0 |  |  |  | i |  | i |
| Permit issued to |  |  |  | 1(s) |  |  |  | 1(s) |  |

Fig. 17

| Terminal | Delay | Backlog | Time slot ><br>Time ><br>Requests | 14<br>130 | 15<br>140 | 16<br>150 | 17<br>160 | 18<br>170 | 19<br>180 |
|---|---|---|---|---|---|---|---|---|---|
| 1 | 17 |  | 1 |  | s,i | i |  |  |  |
| 2 | 6 |  | 0 |  |  |  |  |  |  |
| 3@ | 22 |  | 0 |  |  |  |  |  |  |
| 4 | 47 |  | 0 |  |  |  | i |  |  |
| Permit issued to |  |  |  | 1 |  |  | 1(s) |  |  |

Fig. 18

DATA TRANSMISSION IN A POINT-TO-MULTIPOINT NETWORK

BACKGROUND

The invention relates to the exchange of data between communication devices in a point-to-multipoint configuration. It has particular relevance to packet-switched communication systems.

In point-to-multipoint communication systems wherein a central node transmits and receives data to and from multiple terminals, the central node must utilise a mechanism to determine which of the terminals is allowed access to the transmission medium at any one time. This mechanism is commonly termed the media access control (MAC) protocol. In packet or cell switched networks, such as ATM networks, the MAC typically divides the transmission bandwidth into time slots. These slots are then allocated to terminals for transmitting data. Since the central node controls access to the transmission medium, it sends information or transmission permits to the terminals specifying in which future time slot data may be sent. Permits may be sent as part of payload data sent to the terminals from the node. Alternatively, the central node may send one or more permits separately, for example at scheduled times. In most cases, transmission permits are allocated only to those terminals that have traffic awaiting transmission. Information about the amount of data requiring transmission is sent to the central node. This information may be tagged onto payload data transmitted to the central node in response to a permit allocating a time slot. Alternatively, the information may be sent as a part of a separate packet in response to a polling request from the central node.

In any access control routine it is important that data packets sent in the two directions do not interfere with one another. Conventional systems allow simultaneous transmission and reception by allocating different frequencies to data in the two directions. However, simply separating the frequencies does not safely prevent interference. Specifically, there is still a potential for the transmitter to disturb the receiver in the same node or terminal when these are active simultaneously. This interference requires a frequency filter to be built into the terminal. Efficient use of the transmission capacity requires the central node to transmit and receive continuously and simultaneously. However such filters are extremely costly and when used in each remote terminal represent a substantial portion of the total production costs of such terminals.

There is thus a need for a control mechanism that reliably prevents interference between the transmitter and receiver circuitry in a terminal, but at a substantially reduced cost compared to prior art arrangements.

SUMMARY

A method is proposed for controlling data communication between a central node and a plurality of terminals connected to the central node via a transmission medium. The central node transmits frames of data downstream to said terminals in timeslots and said terminals transmit data packets upstream in timeslots allocated by transmission permits contained in the downstream data. When transmitting a transmission permit to a terminal the central node reserves a time period in the future downstream data stream during which data destined for that terminal will be blocked from transmission. The reserved time period commences at a time location in the future data stream and has a duration, such that data transmitted in a timeslot immediately following the reserved time period will arrive at the terminal after the same has terminated transmission of data in response to the permit.

By scheduling transmission such that permits for some terminals are blocked for a predetermined and finite period of time, the simultaneous transmission and reception at one and the same node can be reliably prevented.

The time period corresponds at least equal to the time required by the terminal for transmitting a data packet. Preferably there is a delay between commencing the reserved time period and transmitting the permit, with this delay corresponding to the processing delay within the terminal. The processing delay is the time required for a terminal to commence outputting a data packet after receipt of a permit. If the time required to terminate transmission of the data in the downstream frame containing the permit is greater than the processing delay, the remaining data must either be always destined for another terminal, or alternatively, a priority must be established between the data packet in the frame and the permit. When the permit, or rather or return data packed from the terminal, has a higher priority, the permit will be transmitted and the data packet will be delayed. Data that is either destined for another terminal or contains dummy information will then be transmitted in the downstream timeslot. This data will not be affected by the blocked time period. If, on the other hand, the downstream data packet has a higher priority than the upstream data packet, the permit for the same terminal will be delayed and a permit for another terminal, or a dummy permit, will be transmitted.

When permits are issued on a regular or scheduled basis, such that their transmission timeslot or the interval between transmission timeslots is known in advance, the central node preferably also blocks a further time period immediately before the timeslot containing a scheduled permit. In this way it can be ensured that a scheduled permit will always arrive at the destination terminal after this terminal has finished transmitting data in response to an earlier permit. The duration of this second time period preferably corresponds to the terminal processing time and the time required for transmitting a data packet. In other words, transmission to the terminal is blocked for a period which covers the time required by a terminal to receive, process and respond in fill to a permit from the central node.

The invention further resides in an arrangement in the central node that includes means for selecting transmission permits and data packets for transmission in each timeslot to said terminals. Means are further provided for storing a schedule of the downstream transmission timeslots, wherein for each terminal, the schedule is blocked for a time period after transmission of a permit to said terminal. The time period terminates at an interval after transmission of the permit that corresponding to the delay required in the terminal for receiving the permit and outputting a data packet in response to the permit. The selecting means are adapted to consult the storage means and select transmission permits and data packets for terminals that are not blocked for a current time slot.

BRIEF DESCRIPTION OF THE DRAWINGS

Further objects and advantages of the present invention will become apparent from the following description of the preferred embodiments that are given by way of example with reference to the accompanying drawings. In the figures:

FIGS. 5 to 18 schematically illustrate the procedure for reserving time slots to prevent simultaneous reception and transmission at the terminals.

DETAILED DESCRIPTION

Figure 1:
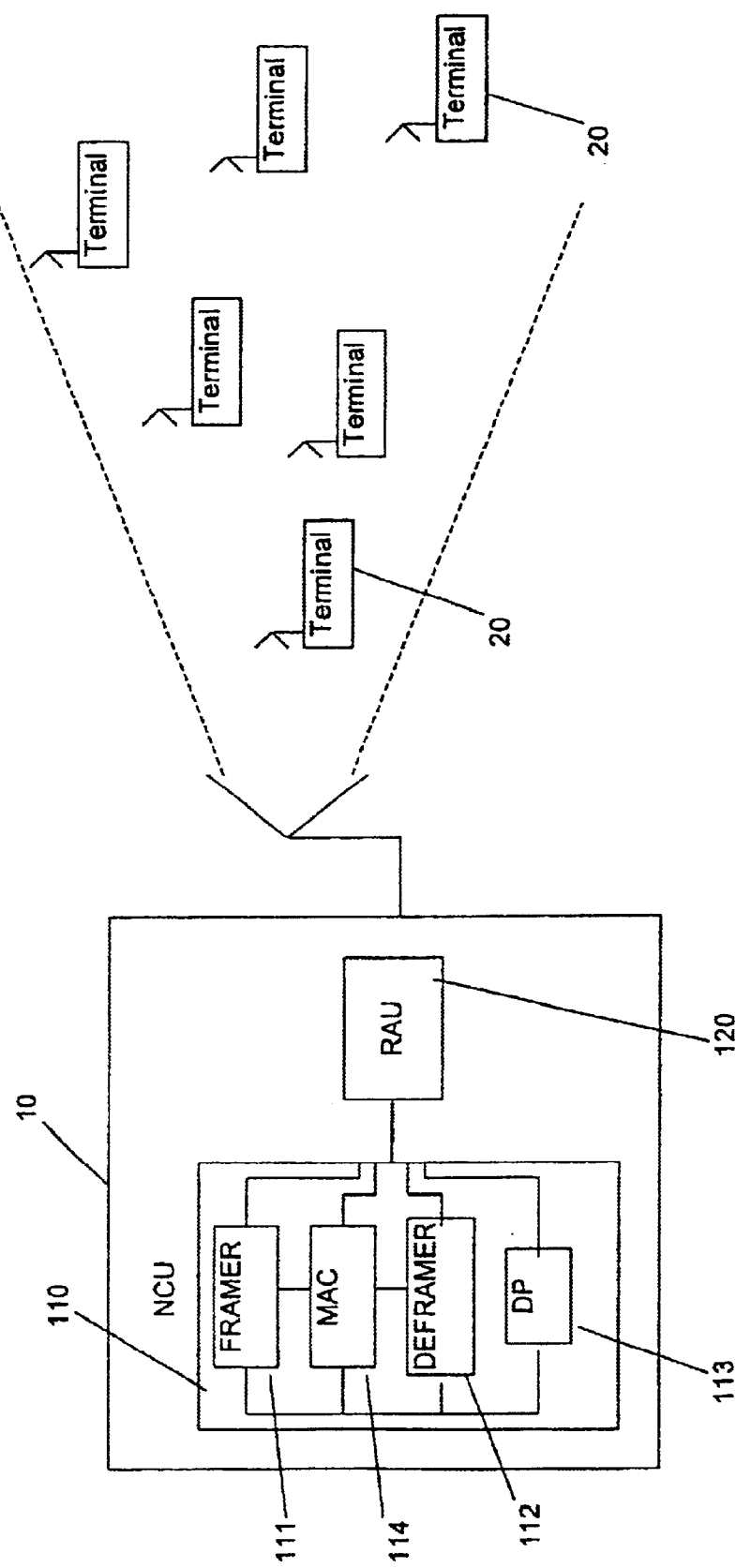
FIG. 1 schematically depicts a point-to-multipoint radio link in an ATM network.

The ATM radio network depicted in FIG. 1 includes a central node 10 and multiple remote terminals 20. The ATM network transports ATM cells across the transmission medium between the central node 10 and the terminals 20, which are situated at different distances from the central node. The central node includes a network control unit (NCU) 110, which controls the formatting of data and also access to the transmission medium. The NCU includes a framer block 111 for handling the queuing of ATM cells and the formatting of these cells into the proprietary radio frame format used in the downstream transmission direction, and a deframer block 112 decoding the frames transmitted from the terminals into ATM cells. A device processor (DP) 113 is also contained in the NCU 110 for handling the signing-on of terminals 20, fault management, performance monitoring and communication with other processors in the network. A medium access control (MAC) block 114 is provided for controlling access to the transmission medium as will be described below. The central node 10 further includes a radio unit (RAU) 120, which handles the transmission, reception and control of the radio link.

Each ATM cell or data packet includes a header containing a destination address. In the downstream direction, all transmission is from the central node 10. All terminals 20 decode the transmission and determine from the addresses in the cell headers whether a user connected to the terminal 20 is the intended recipient of the cell.

In the upstream direction, the terminals 20 transmit data to the central node 10. Upstream transmission is timed such that the node 10 receives signals from only one terminal at a time. This is achieved by dividing the upstream transmission path into time slots for the transmission of a single ATM cell. Only one terminal is permitted to transmit in any single time slot. The MAC function 114 in the central node 10 issues permits indicating which terminal may transmit in a future time slot. The transmission medium bandwidth is allocated according to need. Thus the terminals 20 send requests to the central node 10 indicating the traffic awaiting transmission. These requests are also issued in response to a permit or polling by the central node. In order that the central node 10 holds accurate and updated information about the traffic at each terminal 20, polling is performed regularly, preferably according to a defined schedule. A request from a terminal 20 occupies $\frac{1}{8}^{th}$ of an ATM cell time slot. The request from one terminal is thus sent in a mini-slot, with eight mini-slots making up a single time slot. If more than 8 terminals are signed on to the central node 10, these are grouped into groups of eight terminals. Each poll permit then addressed one group of eight terminals.

Figure 2:
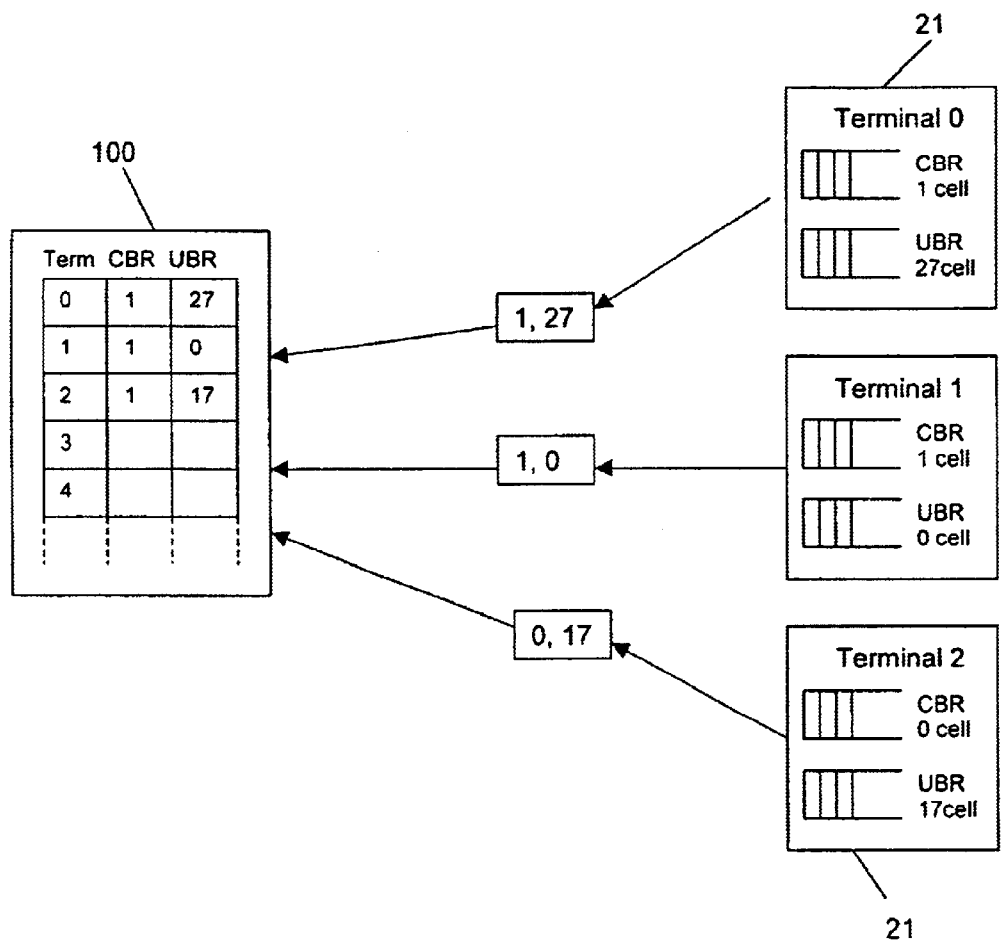
FIG. 2 schematically depicts the handling of transmission requests between the central node and terminals.

FIG. 2 illustrates schematically how requests are handled in the network of FIG. 1. The central node 10 holds an occupancy table 100 in its NCU 110 which is accessed by the MAC block 14. Each terminal 20 contains queue buffers 21. The queue buffers 21 for three terminals numbered 0, 1 and 2 are shown in FIG. 2. In the illustrated embodiment, two types of data are transmitted over the link. These include constant bit rate (CBR) services and unspecified bit rate (UBR) services. As these titles infer, services using the CBR impose delays between ATM cells, while UBR services have no delays specified. The queue buffers 21 in the terminals 20 include two separate buffers for cells of each type of service. The occupancy table 100 in the central node 10 indicates the number of cells of each service type awaiting transmission for each terminal 20. As indicated by the arrows, in response to a poll request issued by the central node, each terminal 20 in the addressed group of eight terminals sends in turn information concerning the status of the queue buffers. Hence the first mini-slot is used by terminal 0, which sends the information 1, 27 indicating that a single CBR cell and 27 UBR cells are awaiting transmission. In the next mini-slot, terminal 1 sends the status of its queue buffers, 1, 0. The following six terminals then follow suit until the full time slot is used.

Time slots in both the upstream and downstream directions are designated for different functions. In the downstream direction, some slots are used for polling, i.e. for sending requests of the queue status of the terminals, some for transmitting permits and some for transmission of ATM cells. In the upstream direction, some time slots are used for the transmission of requests and some for the transmission of ATM cells. Some timeslots may also carry dummy data, when no data is awaiting transmission. The designation of each timeslot may be defined by a cyclical plan or schedule, designed to make optimal use of the bandwidth for the number of terminals 20 signed on.

For those timeslots marked for carrying ATM cells, the central node 10 uses the occupancy table to determine which terminals should be permitted to transmit, and also what type of data this terminal may transmit. Different permits are used for CBR and UBR cells. As long as the occupancy table 100 indicates that CBR service requests are unserviced, these will be handled first. Only when no CBR service requests are indicated in the occupancy table 100 will permits be sent in response to UBR service requests. If more than one terminal has unserviced requests of the same priority, that is for either CBR or UBR services, one request for each terminal will be handled in a round robin fashion, in numerical order. In other words, for the occupancy status indicated in FIG. 2, a CBR permit will be sent first to terminal 0, then to terminal 1. Then a UBR permit will be sent to terminal 0 and then to terminal 2. If no other requests are registered for other terminals, the central node will then send a further UBR permit to terminals 0 and 2 in that order until either no further requests are recorded, or other requests arrive.

Figure 3:
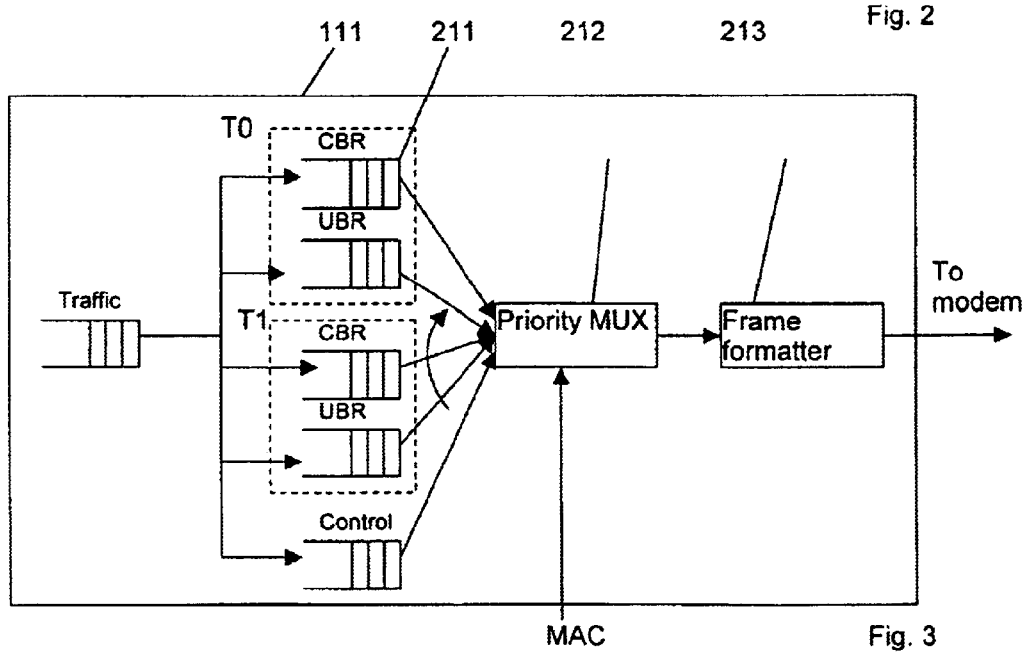
FIG. 3 schematically illustrates the framer for selecting data packets for transmission from the central node to the terminals.

A downstream frame composed in the central node includes a transmission permit and a data packet. Thus in addition to selecting which terminal is to receive the permit in each timeslot, the NCU 110 must also determine which terminal is to receive the data packet. This is determined in a similar fashion to the permits. This is illustrated in FIG. 3. The framer 111 holds a queue buffer 211 for the various types of data that may be assembled into a downstream frame. As for upstream data, this will include CBR and UBR service data for each terminal, T0, T1, etc. This service data is received as traffic by the node and is stored in an intermediate buffer before being sorted into the different types. Control information, for example defining the bit rates for any particular service will also be received by the framer 111. Although not shown in FIG. 3, control information that is not received as traffic, but originates from other elements within the central node may also be assembled into a downstream frame. From the various queue buffers, a priority multiplexer 212 selects the various data according to priority and sends this to a framer 213 for the final assembly. The priority multiplexer 212 is further controlled by the MAC function 114 to select data packets as a function of the terminals to which they are destined as will be described below. As for the permits, data relating to a CBR service will have priority over data for a UBR service. Also control data will generally have the highest transmission priority.

Permits issued for polling for control information from the terminals that are signed on are scheduled and queued with the highest priority.

In addition to permits for ATM cells and polling permits for transmission requests, a further type of permit is issued by the central node for timeslots in the upstream direction. When a new terminal is being connected, this terminal will need to use some upstream timeslots for sending a predetermined pattern to enable the central node 10 to perform measurements for synchronisation and attenuation. A timeslot carrying this kind of information is called a ranging slot.

In order to ensure optimal usage of the transmission bandwidth, the central node 10 should ideally allow continual use of all timeslots both downstream and upstream. Transmission and reception of data at the central node 10 occurs simultaneously. This is possible by using different carrier frequencies for data in the two directions. The radio unit RAU 120 of the central node 10 contains radio transmission and reception circuitry and a filter arrangement to prevent interference between the receiver and transmitter. In order that the upstream data received from different terminals 20 fits into a continual sequence of time slots, the central node 10 must know the round trip delay between transmission of a permit and reception of a data packet in response to the permit for each terminal. In the present system, a maximum delay is selected for all terminals. This maximum delay corresponds to a specified distance from the central node 10. If a terminal 20 is located at a distance from the central node which is nearer than this specified distance, it will be instructed by the central node to add a delay to its processing, such that the round trip delay of each terminal 20 is the same. When the central node 10 is advised of a new terminal connected to the network it measures the initial transmission delay by issuing a ranging permit and determining when the response In is received. If the response arrives too soon to fit into the correct time slot in the upstream data stream, the central node 10 sends a further message instructing the terminal 20 to add a specified delay before responding to permits. In order to prevent collisions, dummy data is transmitted before and after a ranging permit, since the central node 10 cannot know when it will receive a response.

Each terminal 20 also contains transmission and reception circuitry. However the terminals do not contain a filter arrangement for preventing interference between these elements. Since such a filter arrangement conventionally represents a major proportion of the total cost of such terminals, the cost of installing a new terminal is substantially reduced. There is however, still a danger that the reception circuitry may interfere with transmission when both circuits are active simultaneously.

In accordance with the present invention, this is prevented by controlling the timing of data reception and transmission of any one terminal such that the two never occur simultaneously. Since transmission by any terminal occurs only when permitted by the central node 10, this node times the issue of permits such that transmission and reception by any terminal cannot overlap. More specifically, the NCU 110 in the central node 10 generates a record of when any one terminal is likely to be either receiving or transmitting data. Using this information, the central node 10 can avoid transmitting data that will arrive at the terminal when this is already transmitting data and likewise, the central node can avoid transmitting a permit that will provoke a transmission response from the terminal when other data with higher priority is scheduled to arrive at the terminal.

Figure 4:
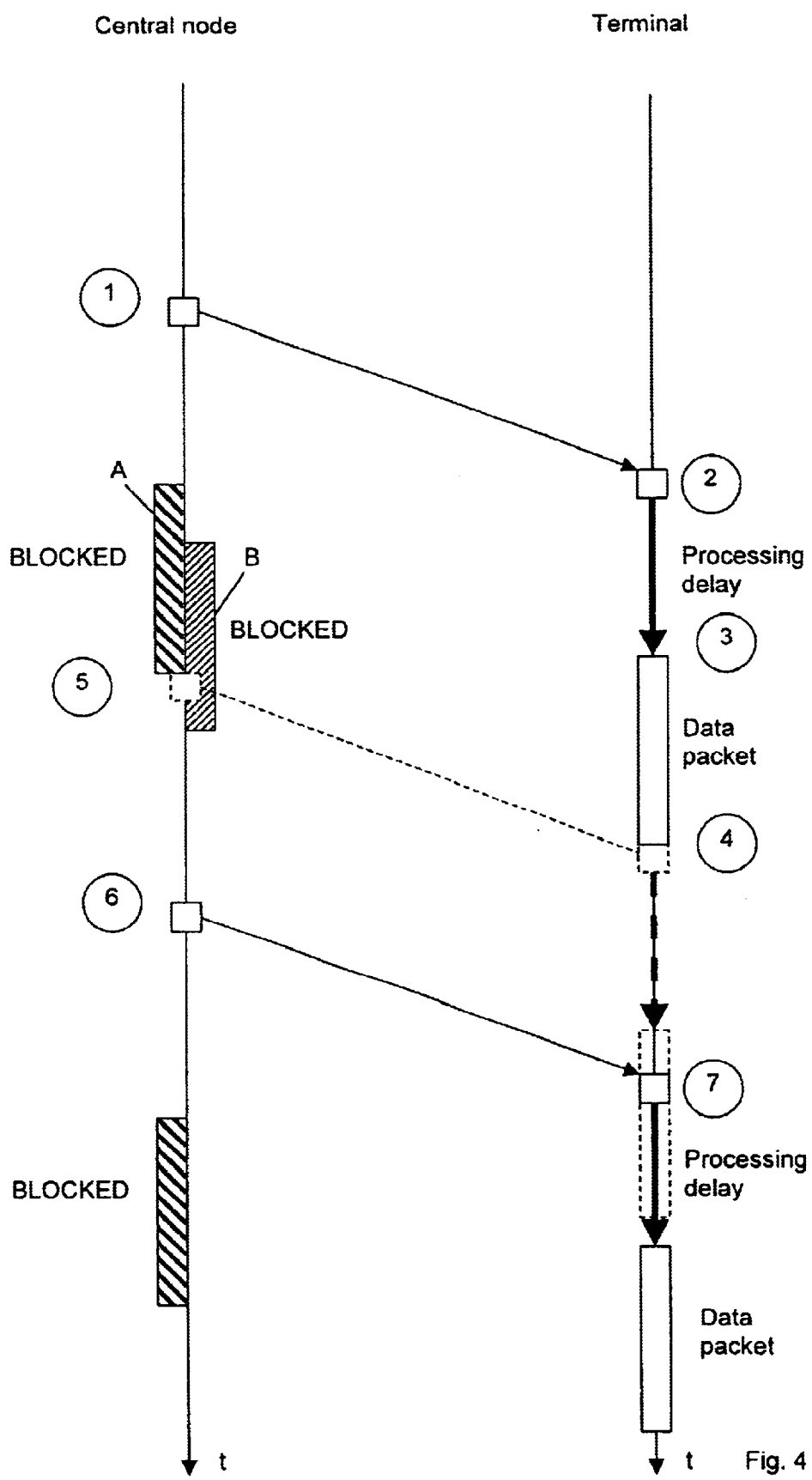
FIG. 4 schematically illustrates the transmission timing between the central node and a terminal.

The use of the record stored in the central node 10 is described in more detail with reference to FIGS. 4 to 18. FIG. 4 shows the timing between the central node 10 and a terminal 20. FIGS. 5 to 18 show a table 115 stored in the central node 10 for controlling permit issues to each terminal connected to the network.

Turning first to FIG. 4, the timing of events in the central node and a terminal 20 are illustrated. At time 1 a permit is sent from the central node 10 to the terminal 20. This is received at time 2. The terminal 20 requires a finite amount of time to process the permit before starting to issue a data packet in response. In general the real processing time for each terminal will be the same and known to the central node 10. However, with the ranging system described above, the terminals 20 will impose possibly different, additional delays depending on their relative distances from the central node 10. If the central node is not informed in advance about the real processing delay within a terminal 20 this may be communicated to the node 10 in the ranging message sent in reply to the ranging permit described above. The processing delay indicated between times 2 and 3 is the total delay for processing a permit before commencing transmission of a data packet. At time 3, the terminal 20 commences transmission of a data packet in the allocated time slot. Transmission is terminated at time 4.

If the terminal is to be prevented from transmitting and receiving data simultaneously, data must not arrive at the terminal during the period between times 3 and 4. A corresponding shaded time period A is marked as blocked in the downstream data schedule. This blocked time period A is thus delayed with respect to the time the permit was transmitted by a time corresponding to the terminal processing delay. It also has a duration equal to the transmission time for tile data packet. The next permit destined for this terminal must therefore arrive either before time 3 or after time 4. This naturally assumes that two permits will never be transmitted so close in time to one another that the permitted data packets overlap. This mechanism is intended to prevent simultaneous transmission and reception at the terminal. It is assumed as given that the system will be arranged to prevent separate items of data being either received or transmitted at the same time. In the present example, a permit will arrive at the terminal 20 after time 4. Taking account of the transmission delay between the central node 10 and the terminal, the next permit will thus be sent after time 5.

As mentioned above, polling permits for obtaining transmission requests from the terminals are issued by the central node 10 at regular or scheduled intervals. These permits have the highest priority. It will be understood that other permit types may also be issued on a scheduled basis, and not on the basis of queue status information. Such permits may be used for enabling transmission of delay-critical services, such as emulated circuit-switched traffic services.

The high priority of these scheduled permits means that transmission time for the corresponding data packets is reserved first. In the timing diagram in FIG. 4, a permit is scheduled at time 6. In order that this scheduled permit does not encounter interference at the terminal, it must be ensured that all transmission in response to an earlier permit has terminated. However, if a permit were sent at time 5 as indicated with a dashed line, the transmission of a data packet would overlap with the arrival of the scheduled permit. In order to ensure no overlap, a time interval corresponding to the transmission time of a data packet must be held free before transmission of the scheduled permit. This time interval is positioned in advance of the scheduled terminal. The start of the blocked time is defined by the following expression: scheduled time of permit−terminal processing delay−length of permitted data packet. The end of the blocked time period is defined by the expression: scheduled time of permit−terminal processing delay+length of the scheduled permit. This second blocked time period is indicated by the shaded area B in the figure. In order to ensure continual upstream transmission a permit for another terminal is selected for transmission in this time slot. The scheduled permit also gives rise to a blocked time period later in the downstream data stream. This time period corresponds to the time when the terminal is transmitting the data packet in response.

In order to ensure that the central node will be able to send scheduled permit the associated blocked time periods must be reserved in advance. This reservation must occur when the central node is deciding on the transmission of a permit and the due time of a scheduled permit is less than the processing delay in the terminal+maximum length of the permitted packet after the transmission time of the permit being considered.

In the present invention, it is assumed that a downstream frame consists of one data packet preceded by one permit. If the timing arrangement illustrated in FIG. 4 is to achieve the separation in time of transmission and reception at a terminal, data packets must also respect the blocking imposed at the central node 10. If the time between sending a permit, for example at 1 and the start of the blocked time period A, in other words the processing delay in the terminal, is shorter than the time required to transmit all the data packet with the permit, then the data packet cannot be sent to the same node as the permit, as this would otherwise overlap the blocked period A. In this case, a frame must always be organised such that the permits and payload data are not destined for the same terminal. Alternatively, a priority algorithm may be employed, whereby either a permit or a data packet would be sent with priority, such that the other permit or data packet would be delayed by at least one time slot. The MAC 114 would decide on the priority and control the selection from the occupancy table 100 and the queue buffers 211 by the priority multiplexer 212 accordingly. Obviously, when the processing delay in the terminal is longer than the time required to transmit the full frame from the central node 10, this problem will not occur. The blocking period A is delayed relative to the transmission time of the permit by a time equivalent to the processing delay in the terminal. Thus there will always be time for the data packet to be transmitted before the terminal 20 commences transmission in response to the permit.

Turning now to FIGS. 5 to 18 a table 115 for controlling the issuing of permits to the terminals is illustrated. Only four terminals are connected to the central node 10, these are labelled terminals 1, 2, 3 and 4. In practice many more terminals might communicate with a single central node. The NCU 110 of the central node 10 will then include timeslot entries for all signed-on terminals.

It is assumed that the sign-on procedure for each terminal 20 is completed and that the central node 10 has knowledge of the processing delay for each terminal 20. The terminals are listed in the first column of the table 115. In the second column, the processing delays of the terminal 20 are listed. These delays correspond to the time period between start of reception of a permit from the central node to start of transmission of a data packet in response to this permit. The backlog is given in the third column. The requests received for each terminal are given in the fourth column.

It is assumed that the data packet length both upstream and downstream is 9 time units and the permit has a length of 1 time unit. As mentioned above, a downstream frame consists of one data packet preceded by one permit. The downstream frame is thus 10 time units long. A timeslot is the period of time required for the transmission of a full frame. One timeslot is thus equal to 10 time units.

Columns 5 to 10 of the permit table 115 are used to designate the use of the future 6 time slots, representing 60 units of time. It will be understood that with the frame structure described above, a permit will be issued only at the start of a timeslot, that is at time 0, 10, 20, 30, 40 etc. It is thus sufficient to determine whether a terminal will be occupied at this particular time unit in order to prevent collision at the terminal. The final row in the table 115 is an indication of which terminals a permit has been issued to.

FIG. 5 indicates the reservation for timeslots 1 to 6 (time unit 0 to 59). Terminal 1 is to receive scheduled permits with 40 time unit intervals, starting in slot 1 (time 0). These permits will thus be sent in slots 1, 5, 9, 13 and so on. In order to prevent collision at a terminal receiving a scheduled permit, timeslots preceding the scheduled permit must be blocked for permits to the same terminal, as these will provoke a transmission response that may occur simultaneously with the arrival of the scheduled permit. Since the table is concerned only with time stating from time unit, there is no need to reserve time before the first scheduled permit. However, the second scheduled permit sent in timeslot 5 will generate blocked time. Since the scheduled time for transmitting the scheduled permit is 40 time units, the processing delay for Terminal 1 is 17 and the time interval between two consecutive permits is at least 9 time units, transmission to Terminal 1 must be blocked in the range of 40−17−9=14 to 40−17+1=24 to prevent earlier permits provoking a collision at the terminal. This range lies in timeslot 3. This period is thus marked with 's' to indicate that permits to Terminal 1 are blocked by a future scheduled permit.

Requested permits are distributed in a round-robin fashion in ascending order of the terminal numbers. The terminal which is next in turn for a requested permit is marked with the character '@'. In FIG. 5, Terminal 1 is the next terminal to receive a requested ATM permit. The first column thus contains @ in the row corresponding to Terminal 1.

A scheduled permit for terminal 1 is then issued at time 0 as dictated by the schedule. This causes permit blocking in the range 17 to 26, i.e. between the time when Terminal 1 starts transmitting the data packet in response to the scheduled permit and the time when transmission of the data packet, which is 9 time units in length, is terminated. This time period corresponds to the permit timeslot 3. This is then blocked by insertion of 'i' to indicate blocking by an issued permit. The table is then completed by recording the scheduled permits issued to Terminal 1 in the final row, by indicating the terminal number followed by '(s)' for a scheduled permit.

The procedure then moves on to timeslot 2, as shown in FIG. 6. This table now includes timeslot 7. No scheduled permits are to be issued in timeslot 7, so this timeslot remains unreserved for the present. In the current slot (timeslot 2) no permit is scheduled. This means that a permit request may be serviced. Terminal 1 is the next terminal marked to receive a requested permit, so a permit is issued to this terminal. A '1' is entered in the final row of the table 115 corresponding to timeslot 2 indicating that a permit has been issued to Terminal 1. This permit generates a blocking slot at timeslot 4, i.e. in the range of (10+17=37 to 10+17+ 9=48). An 'i' is entered in tirmeslot 4. The number of outstanding requests in column 4 corresponding to Terminal 1 is then decremented by 1 leaving 2 unserviced requests. Finally, the Terminal 2 is marked with @ as the next terminal to receive a requested permit.

FIG. 7 shows the status for the next timeslot, 3. No scheduled permits are indicated in timeslot 3. Terminal 2 is next in line for a requested permit. This timeslot is not blocked for terminal 2, so a permit is issued and entered in the final row under timeslot 3. This permit generates blocking over the range 26 to 35, that is a block for a permit in timeslot 4. An 'i' is entered in column 6 under Terminal 2. The requests for Terminal 2 are decremented to 2.

In FIG. 8, Terminal 3 is next in line for a requested permit. This generates blocking in timeslot 7. The request value for Terminal 3 is decremented to 2. Terminal 4 is next line for a requested permit.

In timeslot 5 shown in FIG. 9, a permit is scheduled for terminal 1. This is issued and generates blocking in timeslot 7.

In timeslot 6 shown in FIG. 10, no scheduled permits are indicated. Terminal 4 is next in line for a requested permit. A permit is issued and generates blocking in slot 11.

In timeslot 7 in FIG. 11, Terminal 1 is next in line for a requested permit. However, timeslot 7 is blocked for permits for Terminal 1 both by an issued permit (i) and by a future scheduled permit (s). The permit thus goes to the next terminal in ascending order, which is Terminal 2. This generates blocking in timeslot 8. Terminal 2 requests are decremented. Because Terminal 1 was missed in the normal round-robin order, it receives a backlog notation in column 3. A backlog notation is services with a higher priority than the normal request permit order.

In the next range of six timeslots, 8 through 13 shown in FIG. 12, a permit is scheduled in timeslot 13. This is entered in the last row of the table 115. This future scheduled permit also generates a block in timeslot 11. For the current timeslot 8, Terminal 3 is marked for the next requested permit. However, Terminal 1 has a backlog notation and so must be serviced first. Terminal 1 thus receives a permit in timeslot 8 and generates a block in timeslot 10. The backlog and request count for terminal 1 are both decremented.

In timeslot 9 shown in FIG. 13, Terminal 1 is to receive a scheduled permit This is issued which generates blocking in timeslot 11.

Terminal 3 receives a request permit in timeslot 10 shown in FIG. 14. A block is entered for this terminal in timeslot 13. The requests for terminal 3 are decremented. Terminal 3 now has no outstanding requests.

In timeslot 11 shown in FIG. 15, Terminal 4 is marked for a request permit. However Terminal 4 is blocked in this timeslot. Terminal 1 is next in turn, however Terminal 1 is also blocked for timeslot 11. The permit thus goes to Terminal 2. A block is entered in timeslot 12 for terminal 3. The requests for Terminal 2 are reduced to 0. Terminals 4 and 1 both receive a backlog notation. Terminal 3 is marked as the next terminal for a request permit.

In FIG. 16 timeslot 17 is shown. A scheduled permit for Terminal 1 is marked in this timeslot. A corresponding block is entered for Terminal 1 in timeslot 15. The backlog notation of Terminal 4 means that this terminal receives a requested permit in timeslot 17. A block is entered in slot 17. Both the backlog notation and request count for Terminal 4 is decremented. Terminal 4 now also has no outstanding requests for service.

In timeslot 13 shown in FIG. 17, a scheduled permit is issued to Terminal 1. This generates a block in timeslot 15. In timeslot 14 shown in FIG. 18, the backlog request for Terminal 1 is services by issuing a requested permit. A corresponding block is entered in timeslot 16. From this point onwards dummy permits will be issued until another permit is scheduled, or the requests are incremented following a poll permit from the central node 10.

The table 115 illustrated in FIGS. 5 to 18 has included only data for issuing permits. It will be understood that all other data sent to the terminals must be controlled in the same fashion. In the illustrated tables only the timeslots corresponding to blocked permits are noted for ease of understanding. However, for those cases when the actual blocked time periods overlap two timeslots, data packets addressed to the terminal in question may be blocked for both time slots. For Terminal 2, a further constraint exists. The processing delay of Terminal 2 is 6 time units. However, the time required to transmit or receive a data packet is 9 time units. Thus a permit sent in one timeslot to Terminal 2 will effectively block data packets to the same terminal for that time slot and also the following time slot. Consequently, a data packet for Terminal 2 can never be transmitted in the same time slot as a permit for Terminal 2. As mentioned with reference to FIG. 4, depending on the services using Terminal 2, it may be necessary to apply a higher priority to downstream data packets than upstream data packets, such that a permit for upstream data transmission is delayed in favour of a downstream data packet.

It will be understood that the reservation of time slots in the downstream data path may also be applied to other frame structures. Depending on the structure, more than one timeslot may be blocked by any single earlier permit or scheduled permit.

By controlling access to the transmission medium using the described reservation table 115 there will be no danger of data being simultaneously received and transmitted by one and the same terminal. The terminals may accordingly turn off their receivers while transmitting data in order to prevent the risk of interference. The central node 10 will ensure that no data is addressed to a terminal while this terminal is transmitting data. This effectively results in half duplex transmission at each of the terminals registered in the table. Costly filter circuitry for preventing interference between emitter and transmitter circuits within the same terminal is thus no longer required.

However, it will be appreciated that the table 115 may be used to block full duplex transmission to only some terminals in the network, in particular when traffic constraints at some nodes require full duplex transmission at least part of the time. The possibility of half duplex transmission as described above may then be used at those nodes carrying lower traffic densities, or only for new terminals as a lower cost manner or extending the network.

What is claimed is:

1. A method of controlling data communication between a central node and a plurality of terminals each connected to said central node via at least one transmission medium, wherein said central node transmits frames of data downstream to said terminals in timeslots, said downstream data including data packets destined for said nodes and transmission permits, and said terminals transmit data packets upstream in timeslots allocated by said transmission permits, said method comprising the steps of:

upon transmitting a transmission permit to a terminal, reserving a time period in the future downstream data stream during which data from said central node destined for said terminal will be blocked from transmission, the reserved time period commencing at a time location in said future data stream and having a duration, such that data transmitted in a timeslot immediately following said reserved time period will arrive at said terminal after said terminal has terminated transmission of data in response to said permit.

2. The method of claim 1, further comprising the step of starting said reserved time period at the earliest time period after all data in the frame containing said permit is transmitted.

3. The method of claim 1, further comprising the step of starting said reserved time period at the latest at a time interval after transmission of said permit corresponding to a processing delay in said terminal for receiving said permit and starting transmission of a data packet in response to said permit.

4. The method of claim 3, further comprising the steps of:

when the time interval corresponding to said processing delay elapses before all data in the frame containing said permit is transmitted, determining the priority between a data packet destined for said terminal and a transmission permit destined for said terminal, wherein if said transmission permit takes priority, delaying transmission of said data packet.

5. The method of claim 1, further comprising the step of: when a frame of downstream data contains a permit for one terminal, sending the remaining data to at least one other terminal.

6. The method of claim 1, further comprising the step of setting the duration of said served time period to correspond at least to the maximum delay in said terminal for transmitting a data packet in response to saidpermit.

7. The method of claim 1, wherein some timeslots in said downstream data stream are designated for transmitting scheduled transmission permits to at least one terminal, said method further comprising the step of:

for each permit scheduled for a terminal, reserving a further time period in said downstream data stream as blocked for data transmission destined for said terminal, said further reserved time period terminating prior to the timeslot for said scheduled permit and having a duration such that said scheduled permit arrives at said terminal after said terminal has terminated transmission of a data packet in response to a previously received permit.

8. The method of claim 7, wherein the duration of said further time period corresponds essentially to the maximum transmission time for a data packet and the transmission time for the permit.

9. The method of claim 7, further comprising the step of commencing said further blocked time period at a time prior to the timeslot for said scheduled permit that corresponds to the sum of a processing delay in said terminal for commencing transmission of a data packet after receipt of a permit and the maximum transmission time of a data packet.

10. A method of controlling data communication between a central node and a plurality of terminals connected to said central node through at least one transmission medium, wherein said central node transmits frames of data downstream to said terminals in timeslots and said terminals transmit data upstream in timeslots allocated by said central node, said downstream data including transmission permits allocating timeslots in said upstream data stream, said method comprising the steps of:

sending delay requests to said terminals;

receiving responses from said terminals and determining delays indicative of the time required for each terminal to commence transmitting data after receipt of a transmission permit, for each terminal recording said processing time as a first delay;

noting a second delay corresponding to the maximum transmission time of a data packet; and upon transmitting a permit to each terminal, reserving a time period in the future downstream data during which no data is transmitted to said terminal, said time period terminating after the sum of said first and second delays.

11. The method of claim 10, further comprising the step of commencing said time period at the latest after said first delay after transmitting said permit.

12. An arrangement for controlling communication between a central node and multiple terminals connected to said central node via a transmission medium, wherein said central node transmits frames of data downstream to said terminals in timeslots and said terminals transmit data packets upstream to said central node in timeslots allocated by transmission permits contained in said downstream data, said arrangement comprising:

means for selecting transmission permits and data packets for transmission in each timeslot to said terminals;

means for storing a schedule of said downstream transmission timeslots, wherein for each terminal, said schedule is blocked for a time period after transmission of a permit to said terminal, said time period terminating at an interval after transmission of said permit corresponding to the delay in said terminal for receiving said permit and outputting a data packet in response to said permit, and wherein said selecting means are adapted to consult said storage means and select transmission permits and data packets for terminals that are not blocked for a current time slot.

13. The arrangement of claim 12, wherein said time period has a duration that corresponds at least to the maximum time required by said terminal to transmit a data packet in response to said transmission permit.

14. The arrangement of claim 12, further comprising:

means for storing a processing delay for each terminal, said processing delay corresponding essentially to the time required by a terminal to commence transmission of a data packet after receipt of a transmission permit, wherein said blocked time period commences at the latest after a delay corresponding essentially to the processing delay for said terminal.

15. The arrangement of claim 12, wherein said schedule storage means designates at least some time slots for scheduled permits, and further comprising the step of means for blocking a second time period from transmission of data to a terminal prior to a timeslot containing a scheduled permit for said terminal.

16. The arrangement of claim 15, wherein for each terminal said second time period corresponds essentially to the transmission delay of a data packet.

17. The arrangement of claim 15, wherein for each terminal said second time period commences at a time prior to the timeslot for said scheduled permit that corresponds essentially to the processing delay in said terminal for commencing transmission of a data packet after receipt of a permit.

18. A packet-switched network having a central node and multiple terminals connected to said central node via a transmission medium, wherein said central node transmits frames of data downstream to said terminals in timeslots and said terminals transmit data packets upstream to said central node in timeslots allocated by transmission permits contained in said downstream data, said network being wherein said central node includes means for storing a schedule of said downstream transmission timeslots for at least one terminal and means for blocking a time period in said schedule for transmission of data to at least one terminal when sending a transmission permit to said terminal, said time period corresponding at least to the time required by said terminal to transmit a data packet in response to said transmission permit.

* * * * *